(12) United States Patent
Chen et al.

(10) Patent No.: US 12,552,497 B2
(45) Date of Patent: Feb. 17, 2026

(54) UNDERWATER DETECTION DEVICE AND CONTROL METHOD THEREOF

(71) Applicants: Guangzhou University, Guangzhou (CN); GuangZhou Cheng'an Testing LTD. of Highway & Bridge, Guangzhou (CN)

(72) Inventors: Bingcong Chen, Guangzhou (CN); Jiyang Fu, Guangzhou (CN); Airong Liu, Guangzhou (CN); Jiaqiao Liang, Guangzhou (CN); Jianting Cheng, Guangzhou (CN); Yanqing Li, Guangzhou (CN); Guowei Liu, Guangzhou (CN)

(73) Assignees: GUANGZHOU UNIVERSITY, Guangzhou (CN); GuangZhou Cheng'an Testing LTD. of Highway & Bridge, Guangzhou (CN)

( * ) Notice: Subject to any disclaimer, the term of this patent is extended or adjusted under 35 U.S.C. 154(b) by 627 days.

(21) Appl. No.: 18/048,122

(22) Filed: Oct. 20, 2022

(65) Prior Publication Data

US 2023/0174198 A1  Jun. 8, 2023

(30) Foreign Application Priority Data

Dec. 7, 2021 (CN) .......................... 202111483975.0

(51) Int. Cl.
*B63B 21/66* (2006.01)
*B63B 1/04* (2006.01)
(Continued)

(52) U.S. Cl.
CPC ................ *B63B 21/66* (2013.01); *B63B 1/04* (2013.01); *B63B 3/48* (2013.01); *B63B 21/16* (2013.01);
(Continued)

(58) Field of Classification Search
CPC ......... B63B 21/00; B63B 21/16; B63B 21/66; B63B 1/00; B63B 1/04; B63B 3/00; B63B 3/48; B63B 39/00; B63B 39/08; B63B 2021/566; B63B 2205/04; B63G 8/00; B63G 8/001; B63G 8/14; B63G 8/42;
(Continued)

(56) References Cited

U.S. PATENT DOCUMENTS

| 4,502,407 A | * | 3/1985 | Stevens | B63G 8/001 |
| | | | | 114/222 |
| 6,678,589 B2 | * | 1/2004 | Robertson | B63H 25/42 |
| | | | | 701/21 |

FOREIGN PATENT DOCUMENTS

EP         3871970 A1 *  9/2021  ............... B63B 3/38

* cited by examiner

*Primary Examiner* — Lars A Olson
(74) *Attorney, Agent, or Firm* — Getech Law LLC; Jun Ye (57) ABSTRACT

An underwater detection device includes a surface drive boat and an unmanned underwater vehicle. The surface drive boat includes: a hull; transverse attitude-stabilizing thrusters and orbit vectored thrusters arranged at the bottom of the hull; a control box arranged on the hull and electrically connected with the transverse attitude-stabilizing thrusters and the orbit vectored thrusters; a cable and a cable winding assembly arranged on the hull, the control box being connected with the unmanned underwater vehicle by the cable, the cable winding assembly being electrically connected with the control box; and a positioning assembly arranged on the hull and electrically connected with the control box.

9 Claims, 7 Drawing Sheets

(51) Int. Cl.
    *B63B 3/48*          (2006.01)
    *B63B 21/16*        (2006.01)
    *B63B 39/08*        (2006.01)
    *B63G 8/00*         (2006.01)
    *B63G 8/14*         (2006.01)
    *B63G 8/42*         (2006.01)
    B63B 21/56        (2006.01)

(52) U.S. Cl.
    CPC .............. *B63B 39/08* (2013.01); *B63G 8/001* (2013.01); *B63G 8/14* (2013.01); *B63G 8/42* (2013.01); *B63B 2021/566* (2013.01); *B63G 2008/007* (2013.01)

(58) Field of Classification Search
    CPC ...... B63G 8/16; B63G 8/41; B63G 2008/007; G05D 1/02; G05D 1/0206; G05D 1/0268
    USPC ......................................................... 114/312
    See application file for complete search history.

UNDERWATER DETECTION DEVICE AND CONTROL METHOD THEREOF

TECHNICAL FIELD

The present invention relates to the technical field of underwater detection, in particular to an underwater detection device and a control method thereof.

BACKGROUND

There are many underwater facilities in water, that have been used for a long time, in China. According to the statistics of the Ministry of Communications, by the end of 2019, there were a total of 351,300 wading bridges in the whole country, with 40% in the aging period. In addition, the structural defect detection of underwater facilities in water, such as docks, marine ranches, dams, water storage reservoirs, marine wind power generation facilities, water supply and drainage pipes and immersed tube tunnels, is urgently needed. In general, detection mechanisms detect the width of underwater cracks by adopting frogmen or underwater detection robots. Compared with underwater detection robots, frogman detection is low in efficiency and high in cost, thereby being inevitably eliminated in the future market.

At the present stage, most of underwater detection robots used on the market are in wired connection, that is to say, cables are connected to the underwater detection robots in water on the shore or by large ships, thereby causing too long cables with ineffective length, and lower flexibility of motion and longer signal transmission distance of the underwater detection robots. Although the way of wired connection by cables can ensure effective transmission of data, the cables carried by underwater detection robots are easily entangled by passing ships or debris in water due to the complex hydrological environment, which affects the detection efficiency and easily leads to unnecessary economic losses. In addition, in the case of rapid flow, underwater detection robots are positioned inaccurately in the horizontal direction due to lack of positioning systems in the horizontal direction and connection of cables from the shore to them in water, thereby causing a serious adverse impact on detection and recovery processes.

SUMMARY

In order to solve the above technical problems, an objective of the present invention is to provide an underwater detection device featuring accurate positioning and efficient detection, and a control method thereof.

A first technical solution adopted by the present invention is as follows:

An underwater detection device, including a surface drive boat and an unmanned underwater vehicle for detecting an underwater structure, where the surface drive boat includes:
  a hull;
  transverse attitude-stabilizing thrusters and orbit vectored thrusters arranged at the bottom of the hull, the transverse attitude-stabilizing thrusters being configured to keep the hull stable, the orbit vectored thrusters being configured to adjust the attitude of the hull and drive the hull to move forward;
  a control box arranged on the hull and electrically connected with the transverse attitude-stabilizing thrusters and the orbit vectored thrusters;
  a cable and a cable winding assembly arranged on the hull, the control box being connected with the unmanned underwater vehicle by the cable, the cable winding assembly being electrically connected with the control box, the cable winding assembly being configured to adjust the telescopic length of the cable; and
  a positioning assembly arranged on the hull, electrically connected with the control box and configured to position the hull.

Further, the hull includes floating plates and a deck; the floating plates are fixed on a lower surface of the deck; the control box, the cable, the cable winding assembly and the positioning assembly are all arranged on the deck; and the transverse attitude-stabilizing thrusters and the orbit vectored thrusters are arranged at the bottoms of the floating plates.

Further, the floating plates include a front floating plate and two rear floating plates; each of lower parts of edges of two sides of the front floating plate is provided with one of the transverse attitude-stabilizing thrusters; and each of lower parts of the two rear floating plates is provided with one of the orbit vectored thrusters.

Further, each of the rear floating plates includes a seal shell and a first track; the first track is arranged on an inner bottom surface of the seal shell; each of the orbit vectored thrusters comprises a driver, a first steering engine, a rotary connecting rod, a thruster fixing assembly and a thruster body; the driver, the first steering engine and the rotary connecting rod are arranged in the seal shell; the thruster fixing assembly and the thruster body are both arranged below the seal shell; the driver is electrically connected with the first steering engine; the rotary connecting rod has a fixed end fixedly connected with an output shaft of the first steering engine, and a rotating end installed on the first track; a connecting plate is arranged on the thruster fixing assembly and passes through the seal shell and the first track in sequence to be fixedly connected with the rotating end of the rotary connecting rod; the thruster body is installed on the thruster fixing assembly; and both the driver and the thruster body are electrically connected with the control box.

Further, the cable winding assembly includes a first motor, a driving wheel, a drive belt and a driven wheel; the first motor, the driving wheel and the driven wheels are all installed on the deck; the first motor is electrically connected with the control box and has an output shaft drivingly connected with the driving wheel; the driving wheel is drivingly connected with the driven wheel by the drive belt; and the cable is wound around the driven wheel.

Further, the control box includes a seal box body, a control assembly and a power supply assembly; the control assembly and the power supply assembly are both arranged in the seal box body; the control assembly is configured to provide control signals for the transverse attitude-stabilizing thrusters, the orbit vectored thrusters, the cable winding assembly, the positioning assembly and the unmanned underwater vehicle; and the power supply assembly is configured to provide power for the transverse attitude-stabilizing thrusters, the orbit vectored thrusters, the cable winding assembly, the positioning assembly and the unmanned underwater vehicle.

Further, the surface drive boat further includes a solar panel arranged on the hull and electrically connected with the power supply assembly.

Further, the surface drive boat further includes a wireless communication assembly arranged on the hull, signally connected with the control assembly and configured to communicate with a cloud terminal or a remote terminal.

Further, the surface drive boat further includes a searchlight and a camera, and the searchlight and the camera are both arranged at a front end of the hull and electrically connected with the control box.

A second technical solution adopted by the present invention is as follows:

A control method of an underwater detection device, the method being configured to be implemented by the underwater detection device, where the method includes the following steps:

obtaining, by a positioning assembly, first positioning information of a water drive boat;

controlling transverse attitude-stabilizing thrusters and orbit vectored thrusters to operate according to the first positioning information, such that the water drive boat reaches a preset first water surface position and keeps stable;

adjusting, by a cable winding assembly, the telescopic length of a cable to a preset first length, and controlling, by a control box, an unmanned underwater vehicle to move to a preset first underwater position;

detecting, by the unmanned underwater vehicle, an underwater structure to be detected, and transmitting, by the cable, detected data to the control box; and winding the cable by the cable winding assembly, such that the unmanned underwater vehicle returns to a water surface and then is transported to a next detection point by the surface drive boat.

The present invention has the following beneficial effects: in an underwater detection device and a control method thereof provided by the present invention, positioning information of a surface drive boat is obtained by a positioning assembly; transverse attitude-stabilizing thrusters and orbit vectored thrusters are controlled to operate according to the positioning information, such that the surface drive boat reaches a preset water surface position and keeps stable; the telescopic length of a cable is adjusted to a preset length by a cable winding assembly, and an unmanned underwater vehicle is controlled by a control box to move to a preset underwater position; then an underwater structure to be detected can be detected by the unmanned underwater vehicle, and detected data is transmitted to the control box by the cable; and the cable can be wound by the cable winding assembly after detection, such that the unmanned underwater vehicle returns to a water surface and then is transported to a next detection point by the surface drive boat. The present invention is capable of detecting the underwater structure by coordinated operation of the surface drive boat and the unmanned underwater vehicle. On the one hand, the surface drive boat can transport the unmanned underwater vehicle to the water surface position that is closer to a horizontal distance of the underwater structure to be detected, such that the length of the cable connected with the unmanned underwater vehicle can be greatly reduced, the flexibility of motion of the unmanned underwater vehicle is enhanced, the signal transmission distance is reduced, the cable can be prevented from being entangled by passing ships or debris in water, and the efficiency of underwater detection is improved; and on the other hand, the positioning assembly can directly obtain positioning data of the surface drive boat, the attitude and position of the surface drive boat can be kept stable by the transverse attitude-stabilizing thrusters and the orbit vectored thrusters, relative position information of the surface drive boat and the unmanned underwater vehicle can be obtained according to the telescopic length of the cable and the diving depth of the unmanned underwater vehicle, and the unmanned underwater vehicle can be positioned in the horizontal direction in combination with the positioning data of the surface drive boat, such that the positioning accuracy of the unmanned underwater vehicle is improved, the underwater detection and the recovery of the unmanned underwater vehicle are facilitated, and the unmanned underwater vehicle can be automatically inspected.

In reference numbers,

1 denotes a surface drive boat; 2 denotes an unmanned underwater vehicle; 10 denotes a hull; 11 denotes a floating plate; 111 denotes a front floating plate; 112 denotes a rear floating plate; 1121 denotes a seal shell; 1122 denotes a first track; 1123 denotes an installation groove; 1124 denotes a waterproof partition; 12 denotes a deck; 13 denotes a screw; 20 denotes a transverse attitude-stabilizing thruster; 30 denotes an orbit vectored thruster; 31 denotes a driver; 32 denotes a first steering engine; 33 denotes a rotary connecting rod; 34 denotes a thruster fixing assembly; 341 denotes a connecting plate; 35 denotes a thruster; 40 denotes a control box; 41 denotes a seal box body; 50 denotes a cable; 60 denotes a cable winding assembly; 61 denotes a first motor; 62 denotes a driving wheel; 63 denotes a drive belt; 64 denotes a driven wheel; 70 denotes a solar panel; 80 denotes a searchlight; and 90 denotes a camera.

DETAILED DESCRIPTION OF EMBODIMENTS

The present invention is further described in detail below in conjunction with the accompanying drawings and specific embodiments. The numbers of steps in the embodiments below are set only for the convenience of description, the sequence of steps is not limited in any way, and the sequence of performing steps in the embodiments can be adaptively adjusted according to the understanding of those skilled in the art.

In the description of the present invention, the meaning of plurality is two or more. If there is a description of first and second, they are only used for distinguishing technical features and should not be understood as indicating or implying relative importance, implicitly indicating the number of referred technical features or implicitly indicating the order of referred technical features. In addition, unless otherwise defined, all technical and scientific terms used herein have the same meaning as commonly understood by those skilled in the art. The terms used in the specification herein are only used for describing specific embodiments, rather than limiting the present invention.

Figure 1:
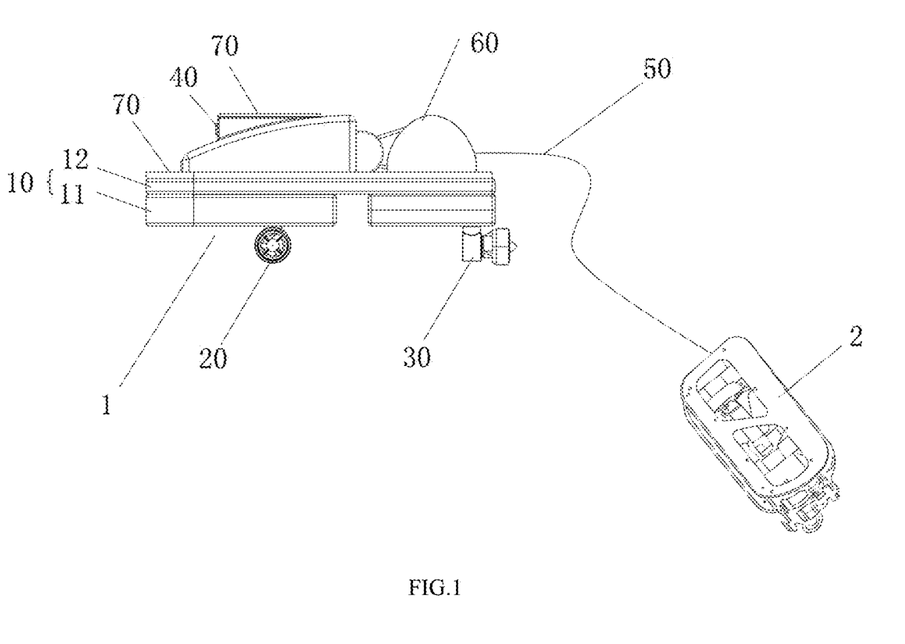
FIG. 1 is a schematic structural diagram of an underwater detection device provided by an embodiment of the present invention.
Figure 2:
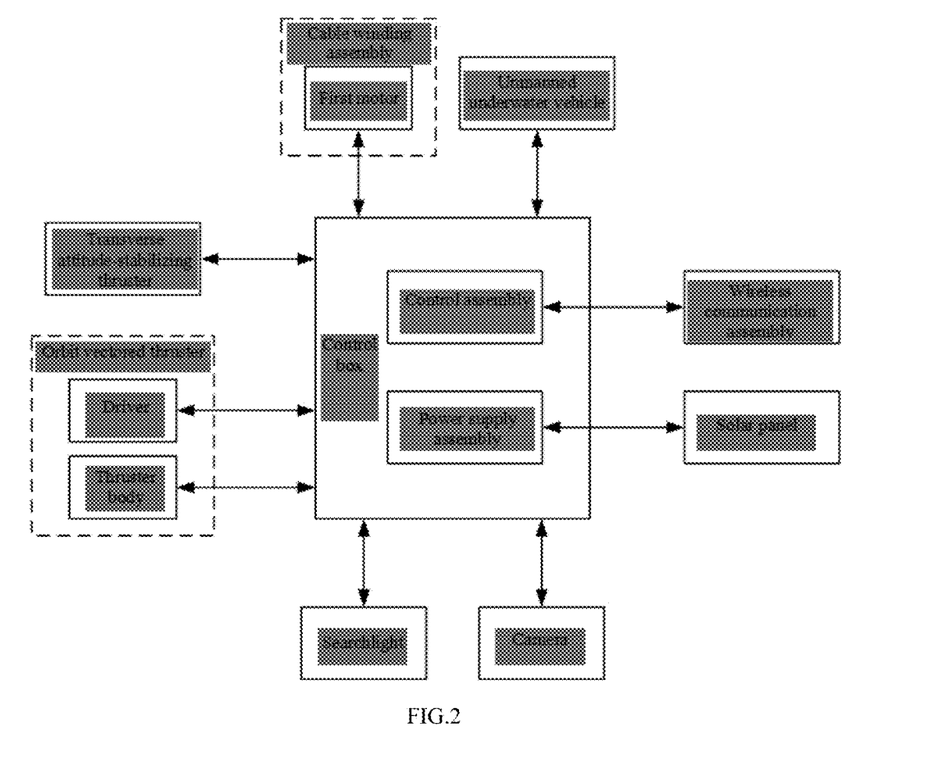
FIG. 2 is a schematic diagram of a signal connection of an underwater detection device provided by an embodiment of the present invention.

As shown in FIGS. 1 and 2, an embodiment of the present invention provides an underwater detection device, including a surface drive boat 1 and an unmanned underwater vehicle 2, where the unmanned underwater vehicle 2 is configured to detect an underwater structure; and the surface drive boat 1 includes:

a hull 10;

transverse attitude-stabilizing thrusters 20 and orbit vectored thrusters 30 arranged at the bottom of the hull 10, the transverse attitude-stabilizing thrusters 20 being configured to keep the hull 10 stable, the orbit vectored thrusters 30 being configured to adjust the attitude of the hull 10 and drive the hull 10 to move forward;

a control box 40 arranged on the hull 10, the transverse attitude-stabilizing thrusters 20 and the orbit vectored thrusters 30 being electrically connected with the control box 40;

a cable 50 and a cable winding assembly 60 arranged on the hull 10, the control box 40 being connected with the unmanned underwater vehicle 2 by the cable 50, the cable winding assembly 60 being electrically connected with the control box 40, the cable winding assembly 60 being configured to adjust the telescopic length of the cable 50; and a positioning assembly arranged on the hull 10, electrically connected with the control box 40 and configured to position the hull 10.

In the embodiment of the present invention, positioning information of a surface drive boat 1 is obtained by a positioning assembly; transverse attitude-stabilizing thrusters 20 and orbit vectored thrusters 30 are controlled to operate according to the positioning information, such that the surface drive boat 1 reaches a preset water surface position and keeps stable; the telescopic length of a cable 50 is adjusted to a preset length by a cable winding assembly 60, and an unmanned underwater vehicle 2 is controlled by a control box 40 to move to a preset underwater position; then an underwater structure to be detected can be detected by the unmanned underwater vehicle 2, and detected data is transmitted to the control box 40 by the cable 50; and the cable 50 can be wound by the cable winding assembly 60 after detection, such that the unmanned underwater vehicle 2 returns to a water surface and then the unmanned underwater vehicle 2 is transported to a next detection point by the surface drive boat 1. The embodiment of the present invention is capable of detecting the underwater structure by coordinated operation of the surface drive boat 1 and the unmanned underwater vehicle 2. On the one hand, the surface drive boat 1 can transport the unmanned underwater vehicle 2 to the water surface position that is closer to a horizontal distance of the underwater structure to be detected, such that the length of the cable 50 connected with the unmanned underwater vehicle 2 can be greatly reduced, the flexibility of motion of the unmanned underwater vehicle 2 is enhanced, the signal transmission distance is reduced, the cable 50 can be prevented from being entangled by passing ships or debris in water, and the efficiency of underwater detection is improved; and on the other hand, the positioning assembly can directly obtain positioning data of the surface drive boat 1, the attitude and position of the surface drive boat 1 can be kept stable by the transverse attitude-stabilizing thrusters 20 and the orbit vectored thrusters 30, relative position information of the surface drive boat 1 and the unmanned underwater vehicle 2 can be obtained according to the telescopic length of the cable 50 and the diving depth of the unmanned underwater vehicle 2, and the unmanned underwater vehicle 2 can be positioned in a horizontal direction in combination with the positioning data of the surface drive boat 1, such that the positioning accuracy of the unmanned underwater vehicle 2 is improved, the underwater detection and the recovery of the unmanned underwater vehicle 2 are facilitated, and the unmanned underwater vehicle 2 can be automatically inspected.

It should be noted that the specific position of the positioning assembly is not shown in FIG. 1, and the positioning assembly can be arranged at any position on the hull 10, as long as it is electrically connected with the control box 40.

It can be understood that the control box 40 communicates with the unmanned underwater vehicle 2 by the cable 50 and provides it with electrical energy, which solves the problems of insufficient cruising power of equipment and inability of real-time communication with the outside during underwater detection operation, and ensures electrical energy supply of the unmanned underwater vehicle 2 and the real-time property of the detected data.

Figure 3:
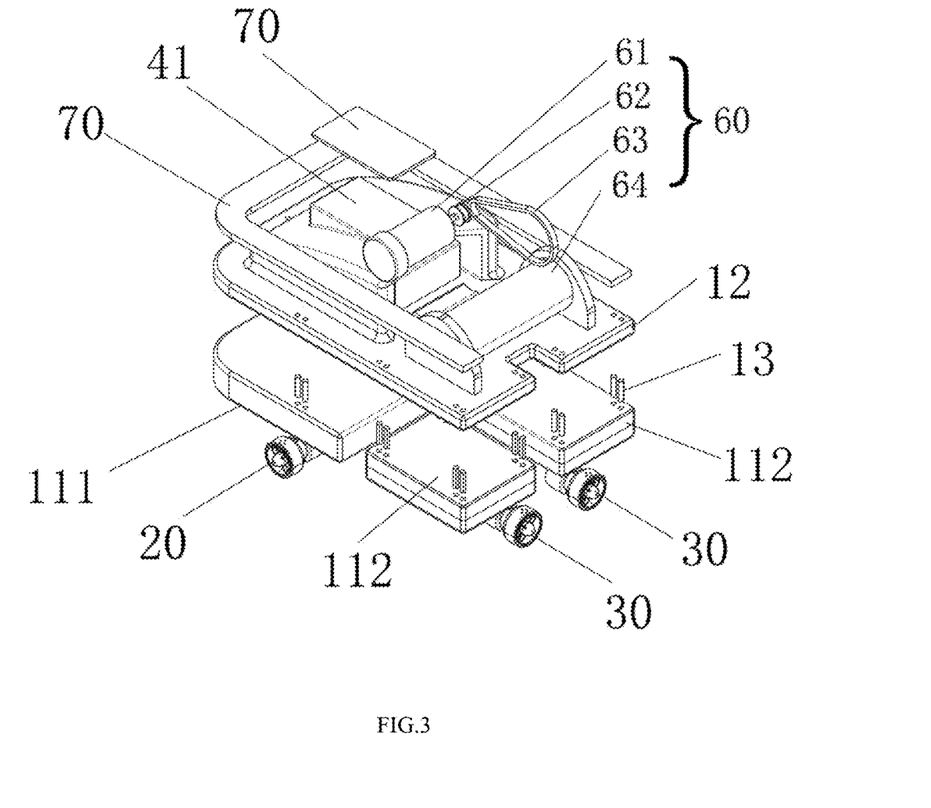
FIG. 3 is a schematic exploded view of a water drive boat provided by an embodiment of the present invention.

As shown in FIGS. 1 and 3, further, as an optional implementation mode, the hull 10 includes floating plates 11 and a deck 12; the floating plates 11 are fixed on a lower surface of the deck 12; the control box 40, the cable 50, the cable winding assembly 60 and the positioning assembly are all arranged on the deck 12; and the transverse attitude-stabilizing thrusters 20 and the orbit vectored thrusters 30 are both arranged at the bottoms of the floating plates 11.

Specifically, the floating plates 11 are configured to provide buoyancy for the surface drive boat 1 to float on the water surface; the deck 12 is configured to install the control box 40, the cable 50, the cable winding assembly 60 and the positioning assembly; and the floating plates 11 and the deck 12 can be fixed together by screws 13 to enhance the structural stability of the surface drive craft 1.

Referring to FIG. 3, further, as an optional implementation mode, the floating plates 11 include a front floating plate 111 and two rear floating plates 112; each of lower parts of edges of two sides of the front floating plate 111 is provided with one of the transverse attitude-stabilizing thrusters 20; and each of lower parts of the two rear floating plates 112 is provided with one of the orbit vectored thrusters 30.

Specifically, the transverse attitude-stabilizing thrusters 20 are located at the lower parts of the edges of the two sides of the front floating plate 111 close to the rear floating plates 112, and function to keep the attitude and position of the surface drive boat 1 stable by transverse thrust control after the surface drive boat 1 reaches a designated position; and the orbit vectored thrusters 30 are located at the lower parts of the rear floating plates 112, function to adjust the attitude of the surface drive boat 1 and provide power for the forward movement of the surface drive boat 1, and cooperate with the transverse attitude-stabilizing thrusters 20 to keep the attitude and position of the surface drive boat 1 stable.

Figure 4:
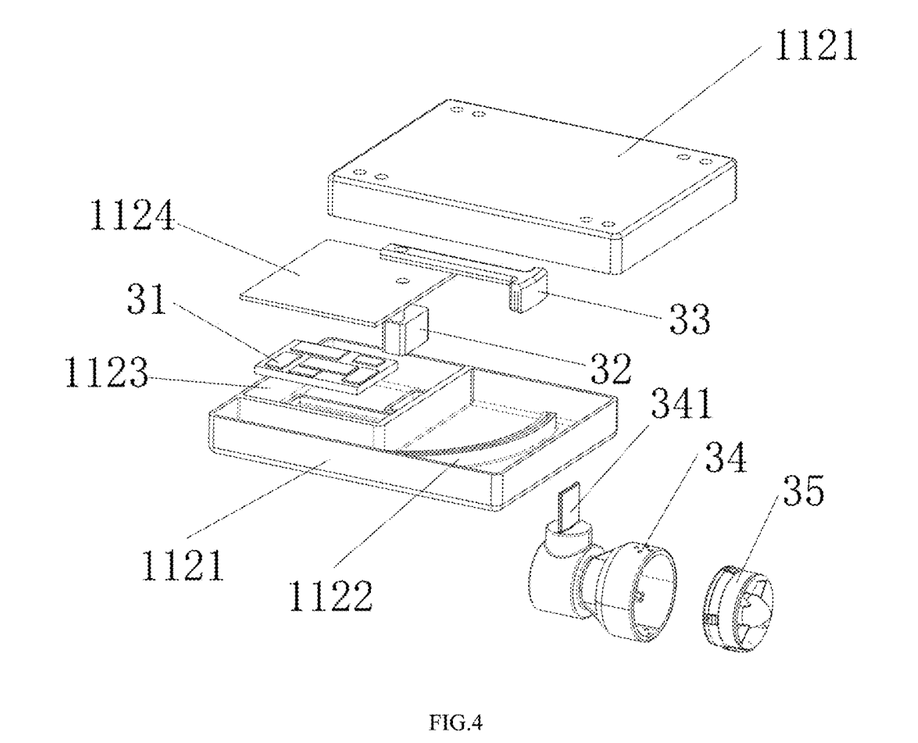
FIG. 4 is a schematic exploded view of a rear floating plate and an orbit vectored thruster provided by an embodiment of the present invention.

Referring to FIGS. 2 and 4, further, as an optional implementation mode, each of the rear floating plates 112 includes a seal shell 1121 and a first track 1122; the first track 1122 is arranged on an inner bottom surface of the seal shell 1121; each of the orbit vectored thrusters 30 includes a driver 31, a first steering engine 32, a rotary connecting rod 33, a thruster fixing assembly 34 and a thruster body 35; the driver 31, the first steering engine 32 and the rotary connecting rod 33 are all arranged in the seal shell 1121; the thruster fixing assembly 34 and the thruster body 35 are both arranged below the seal shell 1121; the driver 31 is electrically connected with the first steering engine 32; a fixed end of the rotary connecting rod 33 is fixedly connected with an output shaft of the first steering engine 32, and a rotating end of the rotary connecting rod 33 is installed on the first track 1122; a connecting plate 341 is arranged on the thruster fixing assembly 34, and the connecting plate 341 passes through the seal shell 1121 and the first track 1122 in sequence to be fixedly connected with the rotating end of the rotary connecting rod 33; the thruster body 35 is installed on the thruster fixing assembly 34; and both the driver 31 and the thruster body 35 are electrically connected with the control box 40.

Specifically, the first track 1122 is an arc track with the fixed end of the rotary connecting rod 33 as the center of a circle. In the embodiment of the present invention, the driver 31 is controlled by the control box 40 to drive the first steering engine 32 to operate, then the rotating end of the rotary connecting rod 33 is driven by the output shaft of the first steering engine 32 to move on the first track 1122, and the thruster fixing assembly 34 is driven by the connecting plate 341 to move along the first track 1122, so as to control the attitude of the thruster 35; and meanwhile, the control box 40 controls the thruster body 35 to operate, so as to perform attitude adjustment, forward movement and water surface self-stabilization of the surface drive boat 1 under different attitudes of the orbit vectored thrusters 30.

It can be understood that FIG. 4 shows a schematic exploded view of a rear floating plate on a left side of the surface drive boat 1 in a forward direction and its corresponding orbit vectored thruster, and an orbit vectored thruster corresponding to a rear floating plate on a right side can be arranged symmetrically as shown in FIG. 4.

Figure 5A:
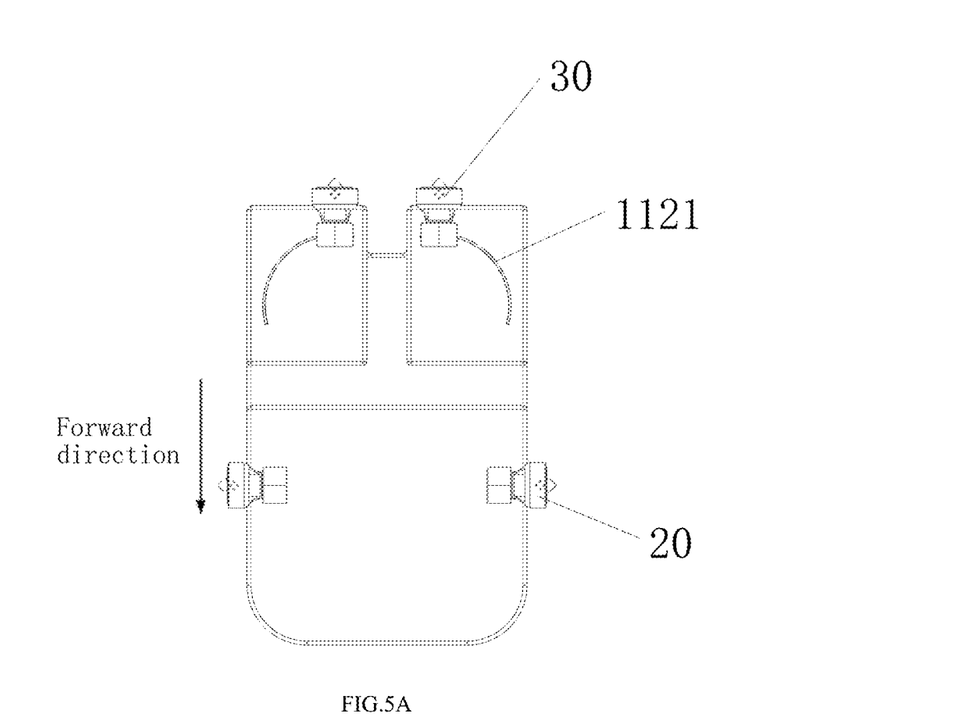
FIG. 5A is a schematic diagram of a first thrust attitude of orbit vectored thrusters provided by an embodiment of the present invention.
Figure 5B:
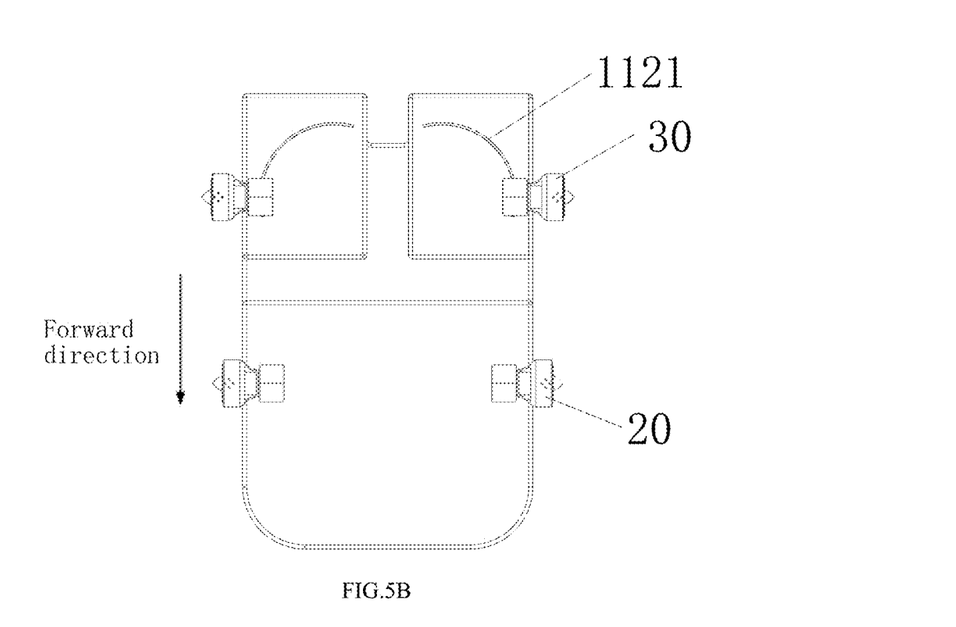
FIG. 5B is a schematic diagram of a second thrust attitude of the orbit vectored thrusters provided by the embodiment of the present invention.
Figure 5C:
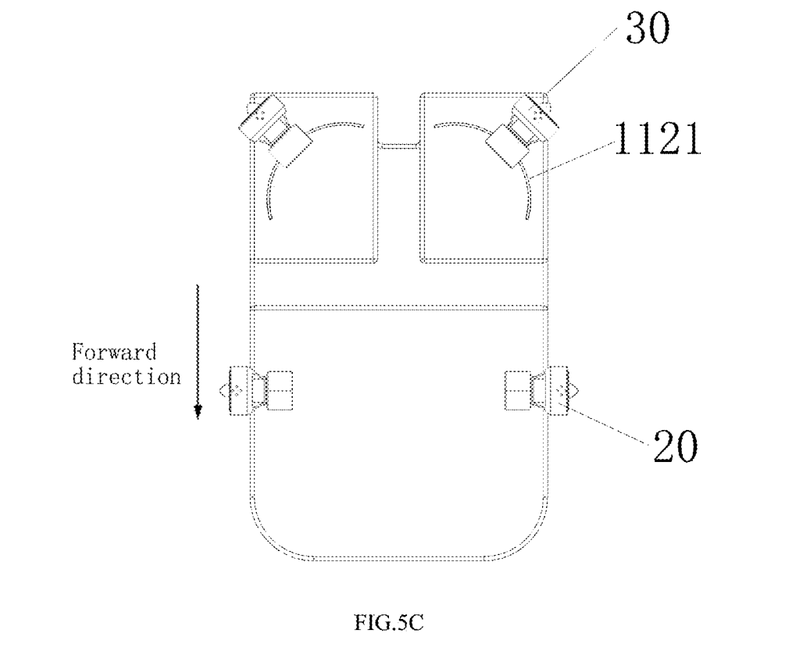
FIG. 5C is a schematic diagram of a third thrust attitude of the orbit vectored thrusters provided by the embodiment of the present invention.

FIGS. 5A to 5C are schematic diagrams of three thrust attitudes of orbit vectored thrusters 30 provided by an embodiment of the present invention, where the orbit vectored thrusters 30 in FIG. 5A are located at a position parallel to the forward direction of the surface drive boat 1 and configured to drive the surface drive boat 1 to move forward; the orbit vectored thrusters 30 in FIG. 5B are located at a position perpendicular to the forward direction of the surface drive boat 1 and configured to cooperate with the transverse attitude-stabilizing thrusters 20 to keep the attitude and position of the surface drive boat 1 stable after the surface drive boat 1 reaches the designated position; and the orbit vectored thrusters 30 in FIG. 5C are changed in position in real time on the first tracks 1122 and configured to adjust the attitude of the surface drive boat 1.

In some optional embodiments, the first steering engine 32 may adopt a high-torque steering engine.

In some optional embodiments, an installation groove 1123 for installing the driver 31 and the first steering engine 32 can be formed in the seal shell 1121, and the installation groove 1123 is isolated from the outside by a waterproof partition 1124 to avoid the impact of water inflow on the driver 31 and the first steering engine 32. The output shaft of the first steering engine 32 can pass through the waterproof partition 1124 to be fixedly connected with the rotary connecting rod 33.

Referring to FIGS. 2 and 3, further, as an optional implementation mode, the cable winding assembly 60 includes a first motor 61, a driving wheel 62, a drive belt 63 and a driven wheel 64; the first motor 61, the driving wheel 62 and the driven wheel 64 are all installed on the deck 12; the first motor 61 is electrically connected with the control box 40, and an output shaft of the first motor 61 is drivingly connected with the driving wheel 62; the driving wheel 62 is drivingly connected with the driven wheel 64 by the drive belt 63; and the cable 50 is wound around the driven wheel 64.

Specifically, before the surface drive boat 1 reaches the designated position, most of the cable 50 is wound around the driven wheel 64; the cable has one end connected with the control box 40 and the other end connected with the unmanned underwater vehicle 2; the unmanned underwater vehicle 2 is carried by the water drive boat 1 through the cable 50 to move on the water surface; after the surface drive boat 1 reaches the designated position, the driven wheel 64 is driven by the first motor 61 to rotate to release the wound cable 50 of a certain length, such that the unmanned underwater vehicle 2 can be controlled by the control box 40 to dive to detect a target underwater structure; and after the unmanned underwater vehicle 2 completes the detection, the driven wheel 64 is driven by the first motor 61 to rotate to wind the cable 50, such that the unmanned underwater vehicle 2 can be recovered to the water surface.

Referring to FIGS. 2 and 3, further, as an optional implementation mode, the control box 40 includes a seal box body 41, a control assembly and a power supply assembly; the control assembly and the power supply assembly are both arranged in the seal box body 41; the control assembly is configured to provide control signals for the transverse attitude-stabilizing thrusters 20, the orbit vectored thrusters 30, the cable winding assembly 60, the positioning assembly and the unmanned underwater vehicle 2; and the power supply assembly is configured to provide power for the transverse attitude-stabilizing thrusters 20, the orbit vectored thrusters 30, the cable winding assembly 60, the positioning assembly and the unmanned underwater vehicle 2.

Specifically, the seal box body 41 is configured to prevent water from entering the control assembly and the power source assembly; and the power source assembly may adopt a storage battery.

It can be realized that the specific installation positions of the control assembly and the power supply assembly in the seal box body 41 are not shown, which are not limited in the embodiment of the present invention, and only a corresponding connection relationship needs to be satisfied.

Referring to FIGS. 1, 2 and 3, further, as an optional implementation mode, the surface drive boat 1 further includes a solar panel 70; the solar panel 70 is arranged on the hull 10; and the solar panel 70 is electrically connected with the power supply assembly.

Specifically, the solar panel 70 can be arranged above the control box 40 and above the deck 12. In fine weather, the power supply assembly can be charged by the solar panel 70, or when the unmanned underwater vehicle 2 performs detection, the power supply assembly and the solar panel 70 simultaneously supply power to the unmanned underwater vehicle 2 to ensure that the unmanned underwater vehicle 2 has sufficient operating time.

Referring to FIG. 2, further, as an optional implementation mode, the surface drive boat 1 further includes a wireless communication assembly arranged on the hull 10, signally connected with the control assembly and configured to communicate with a cloud terminal or a remote terminal.

Specifically, the surface drive boat 1 communicates with the cloud terminal or the remote terminal by a wireless connection, such that the surface drive boat 1 and the unmanned underwater vehicle 2 can be remotely controlled by relevant personnel to operate.

It can be realized that the specific installation position of the wireless communication assembly on the hull is not shown, which is not limited in the embodiment of the present invention, and only a corresponding connection relationship needs to be satisfied.

Figure 6:
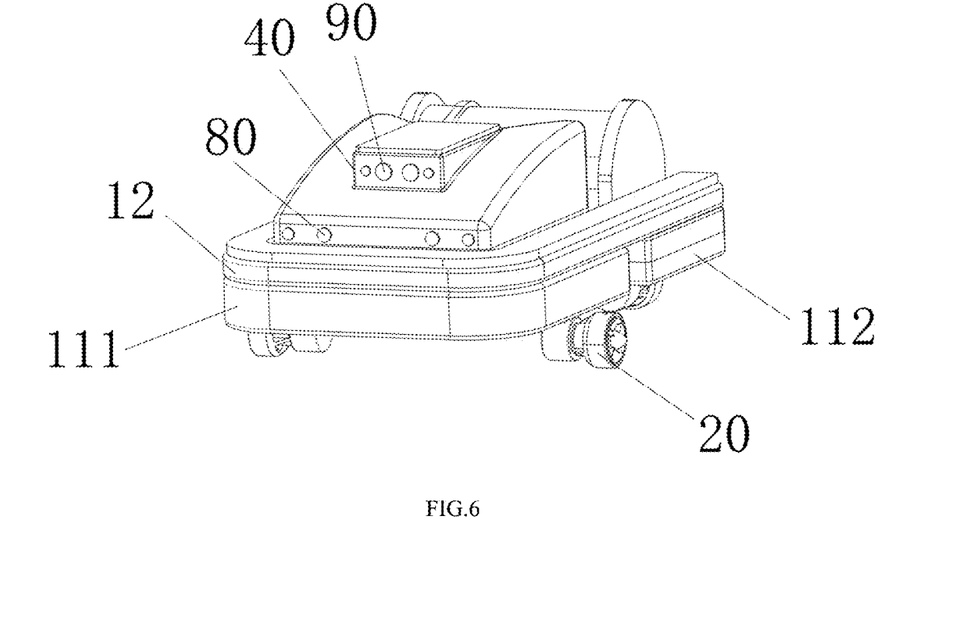
FIG. 6 is a schematic diagram of installation positions of a searchlight and a camera provided by an embodiment of the present invention.

Referring to FIGS. 2 and 6, further, as an optional implementation mode, the surface drive boat 1 further includes a searchlight 80 and a camera 90; the searchlight 80 and the camera 90 are both arranged at a front end of the hull 10; and the searchlight 80 and the camera 90 are both electrically connected with the control box 40.

Specifically, the searchlight 80 is configured to perform search lighting on the water surface at night, and the camera 90 is configured to acquire an image of the water surface in front of the surface drive boat 1, thereby performing obstacle avoidance control of the surface drive boat 1 according to the water surface image. In the embodiment of the present invention, the searchlight 80 is installed at a front end of the deck 12, and the camera 90 is installed at a front end of the control box 40.

The structure of the device in the embodiment of the present invention is described above. A control method of the embodiment of the present invention is described below.

Figure 7:
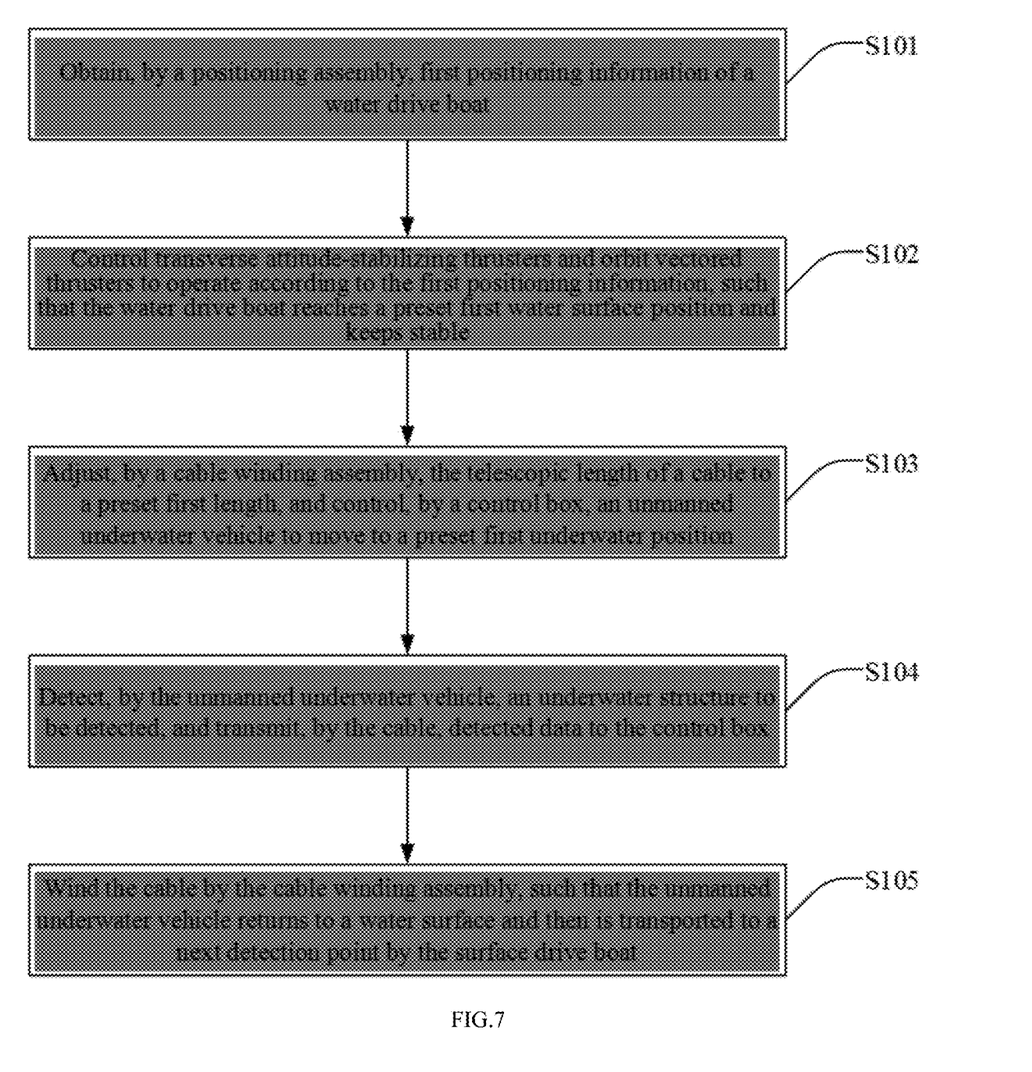
FIG. 7 is a flowchart of steps of a control method of an underwater detection device provided by an embodiment of the present invention.

As shown in FIG. 7, an embodiment of the present invention provides a control method of an underwater detection device, the method being configured to be implemented by the underwater detection device, where the method includes the following steps:

S101: first positioning information of a water drive boat is obtained by a positioning assembly;

S102: transverse attitude-stabilizing thrusters and orbit vectored thrusters are controlled to operate according to the first positioning information, such that the water drive boat reaches a preset first water surface position and keeps stable;

S103: the telescopic length of a cable is adjusted to a preset first length by a cable winding assembly, and an unmanned underwater vehicle is controlled by a control box to move to a preset first underwater position;

S104: an underwater structure to be detected is detected by the unmanned underwater vehicle, and detected data is transmitted to the control box by the cable; and S105: the cable is wound by the cable winding assembly, such that the unmanned underwater vehicle returns to a water surface and then is transported to a next detection point by the surface drive boat.

Specifically, in the embodiment of the present invention, the surface drive boat and the unmanned underwater vehicle are connected by the cable, and the surface drive boat carries the unmanned underwater vehicle to move forward during transportation. A relevant work flow is as follows: before the detection, the surface drive boat transports the unmanned underwater vehicle to a designated detection position, and after the unmanned underwater vehicle reaches the detection position, the cable of a certain length is released by the cable winding assembly, such that the unmanned underwater vehicle conveniently enters the water; meanwhile, satellite positioning information of the surface drive boat is obtained in real time by the positioning assembly on the surface drive boat, the transverse attitude-stabilizing thrusters and the orbit vectored thrusters carried by the surface drive boat generate a thrust force in a horizontal direction to adjust the surface drive boat to a predetermined position if the position changes, and a global positioning system (GPS) and four thrusters carried by the surface drive boat can be utilized to effectively avoid the impact of water flow on the position of the surface drive boat and help the surface drive boat to achieve self-stabilization in the water flow, thereby ensuring that the position of the surface drive boat remains unchanged during the detection, and ensuring the accuracy of position information; the surface drive boat can also be equipped with a sensor for detecting the flow velocity of the water flow, and when the sensor senses that the flow velocity reaches a preset threshold, the extension of the cable can be automatically controlled; when the position information of the unmanned underwater vehicle changes sharply, the cable will be automatically locked to enable it not to continue to extend, and meanwhile, the surface drive boat transmits out-of-control information of the unmanned underwater vehicle to relevant personnel, such that the relevant personnel conveniently know the underwater status of the unmanned underwater vehicle, and then judge whether to make an emergency escape; after reaching the preset underwater position, the unmanned underwater vehicle can detect the underwater structure immediately, and the detected data can be transmitted to the surface drive boat by the cable, and then the surface drive boat uploads the detected data and the position information of the unmanned underwater vehicle to a cloud terminal; and after the detection of all detection points is completed, the relevant personnel can remotely control the cable on the surface drive boat to be wound for lifting the unmanned underwater vehicle to the water surface, the cable is locked in length to enable it not to extend freely, and the surface drive boat is controlled to transport the unmanned underwater vehicle back to the shore.

The structure of the device and the control method in the embodiment of the present invention have been described above. It can be realized that compared with an existing underwater detection robot, the embodiment of the present invention further has the following advantages:

1) The unmanned underwater vehicle and the surface drive boat are convenient to combine, can be used immediately after being installed, and do not need to be assembled by professional technicians.

2) The position information of the unmanned underwater vehicle on a horizontal surface is provided by using the surface drive boat on the water surface, which facilitates the unmanned underwater vehicle to quickly find a detected target and detect the detected target during the detection, and improves the detection efficiency.

3) The unmanned underwater vehicle and the surface drive boat are connected by the cable, which makes the recovery of the unmanned underwater vehicle more convenient.

4) The surface drive boat can supply power to the unmanned underwater vehicle, which prolongs the working time of the unmanned underwater vehicle.

5) The surface drive boat achieves self-stabilization by the transverse attitude-stabilizing thrusters and the orbit vectored thrusters, which ensures the accuracy of the position information of the unmanned underwater vehicle.

It should be realized that the embodiment of the present invention may be realized or implemented by computer hardware and a combination of hardware and software, or by computer instructions stored in a non-transitory computer-readable memory. The above method may be implemented in computer programs by using standard programming techniques including a non-transitory computer-readable storage medium configured with the computer programs, where the storage medium configured with the computer programs causes a computer to operate the method and the accompanying drawings described in the specific embodiment in a specific and predefined manner. Each program may be implemented in a high-level procedural or object-oriented programming language to communicate with a computer system. However, if desired, the program may be implemented in an assembly or machine language. In any case, the language may be a compiled or interpreted language. Furthermore, the program may be run on a programmed application specific integrated circuit for this purpose.

In addition, the operations of the processes described herein may be performed in any suitable order, unless otherwise indicated herein or otherwise clearly contradicted by the context. The processes (or variations and/or combinations thereof) described herein may be performed under the control of one or more computer systems configured with executable instructions, can serve as codes (e.g., executable instructions, one or more computer programs or one or more applications) that are collectively executed on one or more processors, and are implemented in hardware or a combination thereof. The computer program described above includes a plurality of instructions executable by one or more processors.

Further, the above method may be implemented in any type of computing platform operably connected to a suitable computer, including but not limited to a personal computer, a minicomputer, a mainframe, a workstation, a network or a distributed computing environment, and a separate or integrated computer platform, or communicating with charged particle tools or other imaging apparatuses, etc. The aspects of the present invention may be implemented in machine-readable codes stored on a non-transitory storage medium or device, whether a removable or integrated computing platform, such as a hard disk, an optical reading and/or writing storage medium, a random access memory (RAM), a read only memory (ROM), etc., such that it can be read by a programmable computer. The storage medium or device can be used to configure and operate the computer to perform the processes described herein when read by the computer. In addition, the machine-readable codes or part thereof can be transmitted by a wired or wireless network. The invention described herein includes these and other different types of non-transitory computer-readable storage media when such media include instructions or programs that implement the steps described above in conjunction with a microprocessor or other data processors. The present invention further includes the computer itself during programming according to the method and techniques described herein.

The computer program can be used to input data to perform the functions described herein, thereby transforming the input data to generate output data stored to a non-volatile memory. The output information can also be applied to one or more output devices such as displays. In the preferred embodiment of the present invention, the transformed data represents specific visual depictions of physical and tangible objects, including physical and tangible objects produced on the displays.

The above are only the preferred embodiments of the present invention. The present invention is not limited to the above-mentioned implementation modes. As long as it achieves the technical effects of the present invention by the same means, any modifications, equivalent substitutions, improvements, etc. made within the spirit and principle of the present invention should be included within the scope of protection of the present invention. Various modifications and changes can be made to its technical solutions and/or implementation modes within the scope of protection of the present invention.

The invention claimed is:

1. An underwater detection device, comprising a surface drive boat and an unmanned underwater vehicle for detecting an underwater structure, wherein the surface drive boat comprises:
   a hull;
   transverse attitude-stabilizing thrusters and orbit vectored thrusters arranged at bottom of the hull, the transverse attitude-stabilizing thrusters being configured to keep the hull stable, the orbit vectored thrusters being configured to adjust an attitude of the hull and drive the hull to move forward;
   a control box arranged on the hull and electrically connected with the transverse attitude-stabilizing thrusters and the orbit vectored thrusters;
   a cable and a cable winding assembly arranged on the hull, the control box being connected with the unmanned underwater vehicle by the cable, the cable winding assembly being electrically connected with the control box, the cable winding assembly being configured to adjust a telescopic length of the cable; and
   a positioning assembly arranged on the hull, electrically connected with the control box and configured to position the hull, wherein
   the hull comprises floating plates and a deck; the floating plates are fixed on a lower surface of the deck; the control box, the cable, the cable winding assembly, and the positioning assembly are all arranged on the deck; and the transverse attitude-stabilizing thrusters and the orbit vectored thrusters are arranged at bottoms of the floating plates.

2. The underwater detection device according to claim 1, wherein
   the floating plates comprise a front floating plate and two rear floating plates;
   each of lower parts of edges of two sides of the front floating plate is provided with one transverse attitude-stabilizing thruster of the transverse attitude-stabilizing thrusters; and
   each of lower parts of the two rear floating plates is provided with one orbit vectored thruster of the orbit vectored thrusters.

3. The underwater detection device according to claim 2, wherein
   each rear floating plate of the two rear floating plates comprises a seal shell and a first track;
   the first track is arranged on an inner bottom surface of the seal shell;
   each orbit vectored thruster of the orbit vectored thrusters comprises a driver, a first steering engine, a rotary connecting rod, a thruster fixing assembly, and a thruster body;
   the driver, the first steering engine, and the rotary connecting rod are arranged in the seal shell;
   the thruster fixing assembly and the thruster body are both arranged below the seal shell;
   the driver is electrically connected with the first steering engine;
   the rotary connecting rod has a fixed end fixedly connected with an output shaft of the first steering engine, and a rotating end installed on the first track;
   a connecting plate is arranged on the thruster fixing assembly and passes through the seal shell and the first track in sequence to be fixedly connected with the rotating end of the rotary connecting rod;
   the thruster body is installed on the thruster fixing assembly; and both the driver and the thruster body are electrically connected with the control box.

4. The underwater detection device according to claim 1, wherein the cable winding assembly comprises a first motor, a driving wheel, a drive belt, and a driven wheel;

the first motor, the driving wheel, and the driven wheel are all installed on the deck;

the first motor is electrically connected with the control box and has an output shaft drivingly connected with the driving wheel;

the driving wheel is drivingly connected with the driven wheel by the drive belt; and the cable is wound around the driven wheel.

5. The underwater detection device according to claim 1, wherein the control box comprises a seal box body, a control assembly, and a power supply assembly;

the control assembly and the power supply assembly are both arranged in the seal box body;

the control assembly is configured to provide control signals for the transverse attitude-stabilizing thrusters, the orbit vectored thrusters, the cable winding assembly, the positioning assembly, and the unmanned underwater vehicle; and the power supply assembly is configured to provide power for the transverse attitude-stabilizing thrusters, the orbit vectored thrusters, the cable winding assembly, the positioning assembly, and the unmanned underwater vehicle.

6. The underwater detection device according to claim 5, wherein the surface drive boat further comprises a solar panel, wherein the solar panel is arranged on the hull and the solar panel is electrically connected with the power supply assembly.

7. The underwater detection device according to claim 5, wherein the surface drive boat further comprises a wireless communication assembly arranged on the hull;

the wireless communication assembly is signally connected with the control assembly; and the wireless communication assembly is configured to communicate with a cloud terminal or a remote terminal.

8. The underwater detection device according to claim 1, wherein the surface drive boat further comprises a searchlight and a camera; and wherein the searchlight and the camera are both arranged at a front end of the hull and are electrically connected with the control box.

9. A control method of an underwater detection device, the control method being configured to be implemented by an underwater detection device, comprising:

obtaining, by a positioning assembly, first positioning information of a surface drive boat that comprises a hull, wherein the hull comprises floating plates and a deck, and the floating plates are fixed on a lower surface of the deck;

controlling transverse attitude-stabilizing thrusters and orbit vectored thrusters, arranged at bottoms of the floating plates, to operate according to the first positioning information, such that the surface drive boat reaches a preset first water surface position and keeps stable;

adjusting, by a cable winding assembly, a telescopic length of a cable to a preset first length, and controlling, by a control box, an unmanned underwater vehicle to move to a preset first underwater position, wherein the control box, the cable, the cable winding assembly, and the positioning assembly are all arranged on the deck;

detecting, by the unmanned underwater vehicle, an underwater structure to be detected, and transmitting, by the cable, detected data to the control box; and winding the cable by the cable winding assembly, such that the unmanned underwater vehicle returns to a water surface and then is transported to a next detection point by the surface drive boat.

\* \* \* \* \*